US010482626B2

(12) United States Patent
Chang et al.

(10) Patent No.: US 10,482,626 B2
(45) Date of Patent: Nov. 19, 2019

(54) AROUND VIEW MONITORING SYSTEMS FOR VEHICLE AND CALIBRATION METHODS FOR CALIBRATING IMAGE CAPTURE DEVICES OF AN AROUND VIEW MONITORING SYSTEM USING THE SAME

(71) Applicant: MEDIATEK INC., Hsin-Chu (TW)

(72) Inventors: Yu-Lin Chang, Taipei (TW); Yu-Pao Tsai, Kaohsiung (TW)

(73) Assignee: MEDIATEK INC., Hsin-Chu (TW)

( * ) Notice: Subject to any disclaimer, the term of this patent is extended or adjusted under 35 U.S.C. 154(b) by 13 days.

(21) Appl. No.: 15/864,237

(22) Filed: Jan. 8, 2018

(65) Prior Publication Data

US 2019/0213756 A1    Jul. 11, 2019

(51) Int. Cl.
| | |
|---|---|
| *G06T 7/80* | (2017.01) |
| *G06K 9/46* | (2006.01) |
| *G06K 9/62* | (2006.01) |
| *H04N 5/247* | (2006.01) |
| *B60R 1/00* | (2006.01) |

(Continued)

(52) U.S. Cl.
CPC ............ *G06T 7/80* (2017.01); *B60R 1/00* (2013.01); *E05B 81/64* (2013.01); *G06K 9/4604* (2013.01); *G06K 9/6202* (2013.01); *H04N 5/23293* (2013.01); *H04N 5/247* (2013.01); *B60R 2300/105* (2013.01); *B60R 2300/303* (2013.01)

(58) Field of Classification Search
CPC .. H04N 5/23293; H04N 5/247; G06K 9/4604; G06K 9/6202; G06T 7/80; B60R 1/00; E05B 81/64

USPC ....... 348/148, 142, 135, 120, 118, 159, 175, 348/180, 187, 40, 47, 48, 49, 50, 73; 340/435, 425.5, 426.28, 937, 988, 995.28
See application file for complete search history.

(56) References Cited

U.S. PATENT DOCUMENTS

| | | | |
|---|---|---|---|
| 9,087,374 B2 | 7/2015 | Hsu et al. | |
| 9,762,880 B2* | 9/2017 | Pflug | G06T 15/20 |

(Continued)

FOREIGN PATENT DOCUMENTS

| | | |
|---|---|---|
| TW | 201403553 A | 1/2014 |
| TW | I575959 B | 3/2017 |

*Primary Examiner* — Jefferey F Harold
*Assistant Examiner* — Mustafizur Rahman
(74) *Attorney, Agent, or Firm* — McClure, Qualey & Rodack, LLP

(57) ABSTRACT

Calibration methods for calibrating image capture devices of an around view monitoring (AVM) system mounted on vehicle are provided, the calibration method including: extracting local patterns from images captured by each image capture device, wherein each local pattern is respectively disposed at a position within the image capturing range of one of the image capture devices; acquiring an overhead-view (OHV) image from OHV point above vehicle, wherein the OHV image includes first patterns relative to the local patterns for the image capture devices; generating global patterns from the OHV image using the first patterns, each global pattern corresponding to one of the local patterns; matching the local patterns with the corresponding global patterns to determine camera parameters and transformation information corresponding thereto for each image capture device; and calibrating each image capture device using determined camera parameters and transformation information corresponding thereto so as to generate AVM image.

11 Claims, 8 Drawing Sheets

(51) Int. Cl.
*E05B 81/64* (2014.01)
*H04N 5/232* (2006.01)

(56) References Cited

U.S. PATENT DOCUMENTS

| | | | | |
|---|---|---|---|---|
| 9,892,493 | B2* | 2/2018 | Pekkucuksen | G06T 5/006 |
| 9,916,660 | B2* | 3/2018 | Singh | G06T 7/80 |
| 2006/0033612 | A1* | 2/2006 | Santa | E05F 15/40 |
| | | | | 340/435 |
| 2006/0250501 | A1* | 11/2006 | Widmann | B60R 25/1004 |
| | | | | 348/148 |
| 2007/0081262 | A1* | 4/2007 | Oizumi | B60R 1/00 |
| | | | | 359/843 |
| 2009/0257659 | A1* | 10/2009 | Suzuki | B60R 1/00 |
| | | | | 382/199 |
| 2011/0026771 | A1* | 2/2011 | Hsu | G06K 9/00805 |
| | | | | 382/104 |
| 2012/0127312 | A1* | 5/2012 | Nagamine | B60R 1/00 |
| | | | | 348/148 |
| 2012/0320209 | A1* | 12/2012 | Vico | B60R 1/00 |
| | | | | 348/148 |
| 2013/0141578 | A1* | 6/2013 | Chundrlik, Jr. | H04N 7/181 |
| | | | | 348/148 |
| 2013/0234844 | A1* | 9/2013 | Yopp | B60Q 9/008 |
| | | | | 340/435 |
| 2014/0043473 | A1* | 2/2014 | Gupta | H04N 17/00 |
| | | | | 348/135 |
| 2014/0098229 | A1* | 4/2014 | Lu | H04N 7/181 |
| | | | | 348/148 |
| 2014/0184814 | A1* | 7/2014 | Lin | H04N 17/002 |
| | | | | 348/187 |
| 2014/0247354 | A1* | 9/2014 | Knudsen | B60R 1/00 |
| | | | | 348/148 |
| 2014/0320658 | A1* | 10/2014 | Pliefke | B60R 1/002 |
| | | | | 348/148 |
| 2014/0333729 | A1* | 11/2014 | Pflug | G06T 15/20 |
| | | | | 348/47 |
| 2014/0347486 | A1* | 11/2014 | Okouneva | G06T 7/0004 |
| | | | | 348/148 |
| 2015/0049193 | A1* | 2/2015 | Gupta | G03B 43/00 |
| | | | | 348/148 |
| 2016/0210750 | A1* | 7/2016 | Singh | G06T 7/80 |
| 2017/0030126 | A1* | 2/2017 | Elie | E05F 15/614 |

* cited by examiner

AROUND VIEW MONITORING SYSTEMS FOR VEHICLE AND CALIBRATION METHODS FOR CALIBRATING IMAGE CAPTURE DEVICES OF AN AROUND VIEW MONITORING SYSTEM USING THE SAME

BACKGROUND OF THE INVENTION

Field of the Disclosure

The disclosure relates to around-view monitoring systems and methods, and, in particular, to an around view monitoring system for vehicle and a calibration method for calibrating image capture devices of an around view monitoring system using the same.

Description of the Related Art

With the development of vehicle technology, advanced vehicles are also provided with an around-view monitoring (AVM) system, wherein the wide-angle cameras are equipped at different locations to collect full view images of 360-degree around the vehicle so as to help or hint the driver to identify any potential obstacle. Generally, an AVM system is a technology for providing a view of a vehicle on a navigation screen using several cameras, such as four cameras, as if the vehicle is being photographed from above. For example, a camera may be mounted at a front and a rear of a vehicle, as well as left and right side mirrors, respectively.

As more than one camera is being used in one AVM system, and if the relative positions and poses are not known between each of the respective cameras, then calibration between the respective cameras cannot be obtained. As a result, cameras that have unknown relative positioning and poses to one another may result in misalignment in overlapping zones between image capture devices and misaligned image stitching. However, every existing AVM system needs to take several hours or longer to tune or calibrate the output display image or components' three-dimensional attitude manually due to some erroneous parameters arising from optical or vehicle's structural inherent reason to make sure the real-time display image is correct. For example, for calibrating the cameras, an operator may use a tape and at least four checker board patterns placed around the front, rear, left and right sides of the vehicle as ground patterns and then matches the ground patterns to determine the camera parameters. During the calibration, the tape position must be fully fitted with a horizontal vertical line, the deviation of the left, right, front and rear checker board patterns must be exactly the same and the positions of front and rear checker board patterns must be placed in the vehicle centerline to ensure that the results of calibration are correct. This places a great burden on the operator and also takes a great processing time in deriving the parameters.

Accordingly, there is demand for an intelligent AVM system and an associated calibration method to solve the aforementioned problem.

BRIEF SUMMARY OF THE DISCLOSURE

A detailed description is given in the following implementations with reference to the accompanying drawings.

In an exemplary implementation, a calibration method for calibrating image capture devices of an around view monitoring (AVM) system mounted on vehicle is provided. The method includes the steps of: extracting local patterns from images captured by each image capture device, wherein each local pattern is respectively disposed at a position within the image capturing range of one of the image capture devices; acquiring an overhead-view (OHV) image from OHV point above vehicle, wherein the OHV image includes first patterns relative to the local patterns for the image capture devices; generating global patterns from the OHV image using the first patterns, each global pattern corresponding to one of the local patterns; matching the local patterns with the corresponding global patterns to determine camera parameters and transformation information corresponding thereto for each image capture device; and calibrating each image capture device using determined camera parameters and transformation information corresponding thereto so as to generate AVM image.

In another exemplary implementation, another calibration method for calibrating image capture devices of an around view monitoring (AVM) system mounted on vehicle is provided. The method includes the steps of: extracting local patterns and overlapping local patterns from images captured by each of the image capture devices, wherein each local pattern is respectively disposed at a position within the image capturing range of one of the image capture devices and each overlapping local pattern is disposed at an overlapping position at which the image capturing range of each pair of adjacent image capture devices overlap each other; matching the overlapping local patterns between each pair of the adjacent image capture devices to obtain transformation information for each image capture device; generating global patterns represented by integrating the overlapped local patterns between image capture devices based on the transformation information; matching the local patterns with the corresponding global patterns to determine camera parameters and transformation information corresponding thereto for each image capture device; and calibrating each image capture device using the determined camera parameters and transformation information corresponding thereto so as to generate a AVM image.

In yet another exemplary implementation, an around view monitoring (AVM) system for a vehicle is provided. The AVM system comprises a plurality of image capture devices, an AVM device and a display device. The image capture devices are mounted on the vehicle and are configured to capture images with local patterns, wherein each local pattern is respectively disposed at a position within the image capturing range of one of the image capture devices. The AVM device is coupled to the image capture devices and is configured to extracting local patterns from images captured by each of the image capture devices, acquiring an overhead-view (OHV) image from an overhead view point above the vehicle, wherein the OHV image includes first patterns relative to the local patterns for the image capture devices, generating global patterns from the OHV image using the first patterns, each global pattern corresponding to one of the local patterns, matching the local patterns with the corresponding global patterns to determine camera parameters and transformation information corresponding thereto for each image capture device, and calibrating each image capture device using the determined camera parameters and transformation information corresponding thereto so as to generate a AVM image. The display device is coupled to the AVM device and is configured to display the AVM image.

BRIEF DESCRIPTION OF THE DRAWINGS

The disclosure can be more fully understood by reading the subsequent detailed description and examples with references made to the accompanying drawings, wherein.

DETAILED DESCRIPTION OF THE DISCLOSURE

The following description is made for the purpose of illustrating the general principles of the disclosure and should not be taken in a limiting sense. The scope of the disclosure is best determined by reference to the appended claims.

Figure 1:
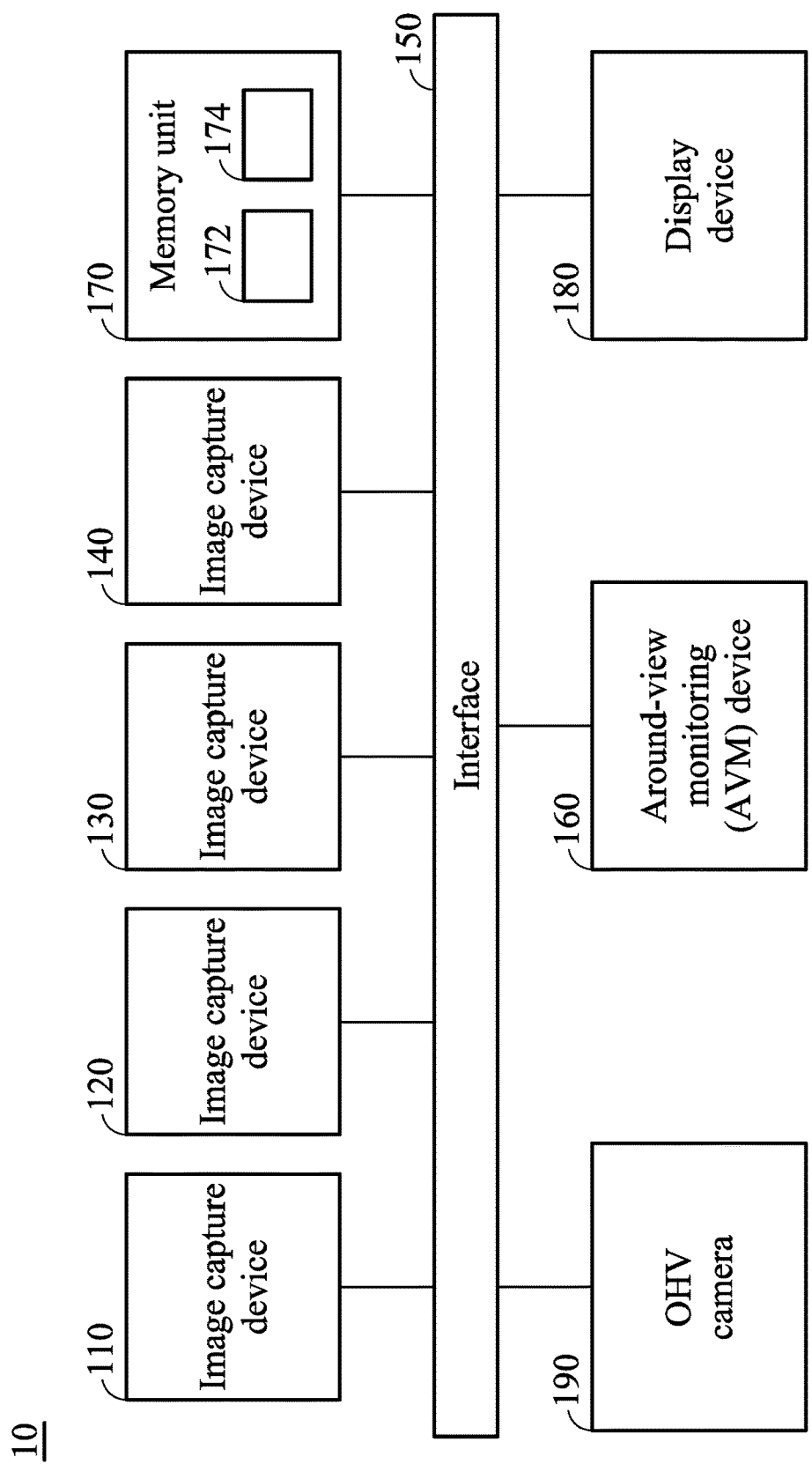
FIG. 1 is a diagram of an AVM system in accordance with an implementation of the disclosure.

FIG. 1 is a diagram of an AVM system in accordance with an implementation of the disclosure. The AVM system 10 can be implemented in an electrical device, such as a mobile device (e.g., a tablet computer, a smartphone, or a wearable computing device) or a laptop computer capable of acquiring images or video data and performing image processing. The AVM system 10 can also be implemented as multiple chips or a single chip such as a system on chip (SOC) or an in-vehicle infotainment IC disposed in a vehicle. For example, the AVM system 10 comprises at least some of a plurality of image capture devices 110 to 140, an interface 150, an AVM device 160, a memory unit 170, and a display device 180. The image capture devices 110 to 140, the AVM device 160, the memory unit 170, and the display 180 can be coupled to each other through the interface 150. The interface 150 may be any wired or wireless data transmission interface or any combination thereof. The image capture devices 110 to 140 can be wide-angle cameras or wide-angle fisheye cameras. The image capture devices 110 to 140 may comprise imaging sensors which may be a single sensor or a sensor array including a plurality of individual or separate sensor units. For example, each of the image capture devices can be an assembly of a set of lenses and a charge-coupled device (CCD), an assembly of a set of lenses and a complementary metal-oxide-semiconductor (CMOS) or the like. In one implementation, for example, the image capture devices 110 to 140 can be multiple cameras with a fisheye lens. In some embodiments, the image capture devices 110 to 140 can be mounted at a front and a rear of a vehicle, as well as left and right side mirrors of the vehicle, respectively, as shown in FIG. 2 and respectively photograph/capture four photographing regions RA1 to RA4 which include a front region, a rear region, a left region, and a right region of the vehicle.

Figure 2:
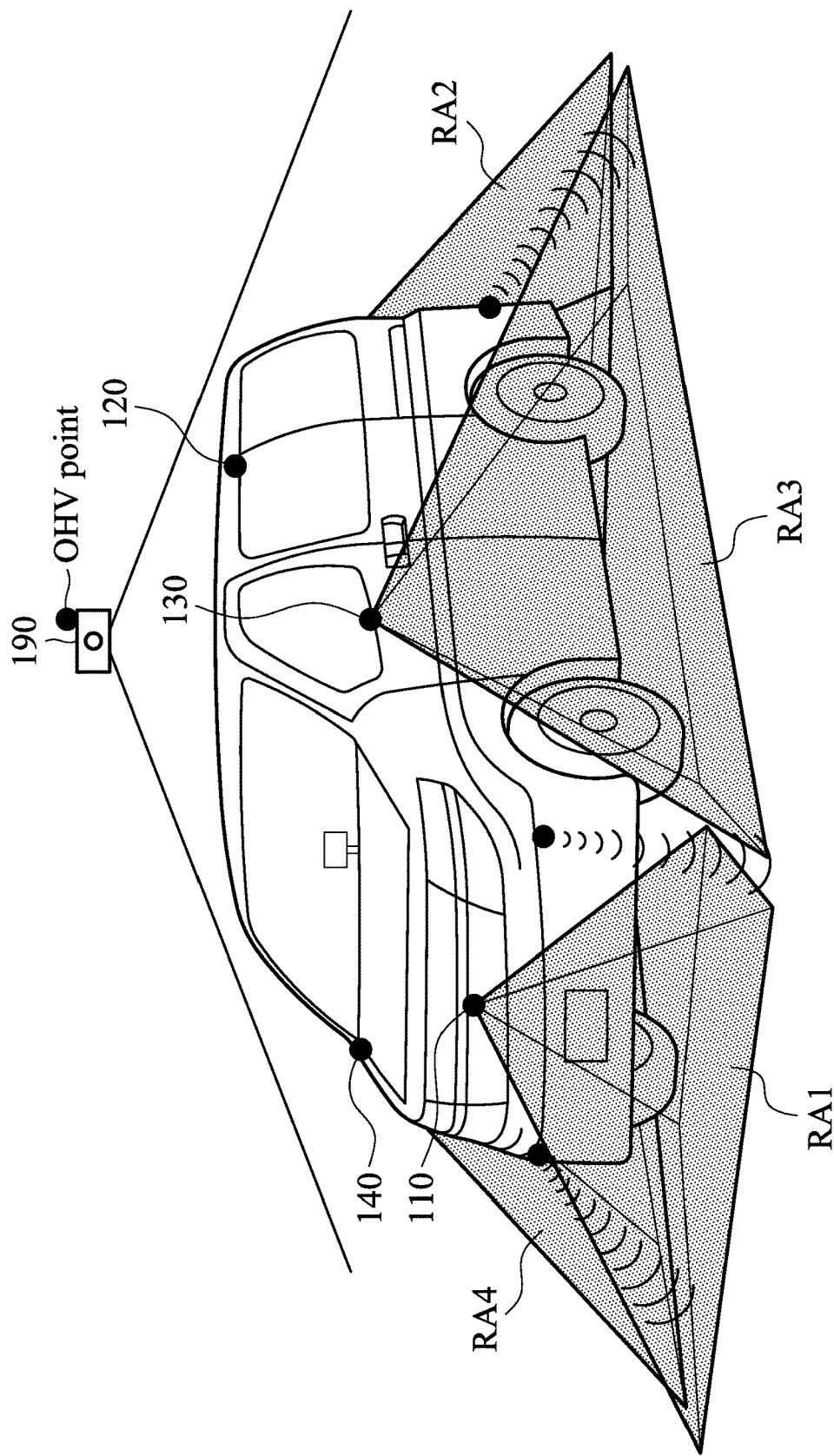
FIG. 2 is a diagram of an image capture device configuration in accordance with an implementation of the disclosure.
Figure 3:
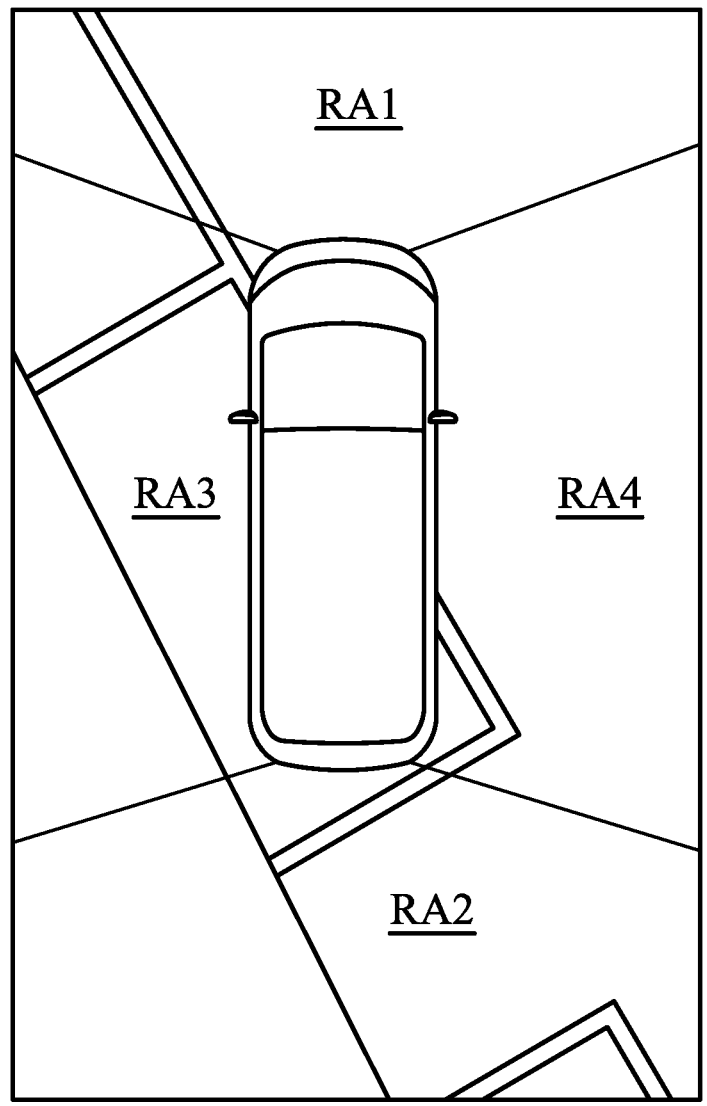
FIG. 3 is a diagram of a AVM image in accordance with an implementation of the disclosure.

FIG. 2 is a diagram of an image capture device configuration in accordance with an implementation of the disclosure. As shown in FIG. 2, the image capture devices 110 to 140 are wide-angle fisheye cameras and are mounted at a front and a rear of a vehicle, as well as left and right side mirrors of the vehicle to respectively photograph/capture four photographing regions RA1 to RA4 which include a front region, a rear region, a left region, and a right region of the vehicle. The AVM image, which is supplied to the driver through the display device 180, is as shown in FIG. 3.

The AVM device 160 may operate by hardware circuits disposed on the electronic device, or by software modules executed by a processor of the electronic device. The AVM device 160 may further include a processor (not shown), which may be a central processing unit (CPU), a microcontroller unit (MCU), a general-purpose processor, a digital signal processor (DSP), or any equivalent circuitry, but the disclosure is not limited thereto. The memory unit 170, for example, may include a volatile memory 171 and/or a non-volatile memory 172. The volatile memory 171 may be a dynamic random access memory (DRAM) or a static random access memory (SRAM), and the non-volatile memory 172 may be a flash memory, a hard disk, a solid-state disk (SSD), etc. For example, the program codes of the applications for use on the AVM system 10 can be pre-stored in the non-volatile memory 172. The processor of the AVM device 160 may load program codes of applications from the non-volatile memory 172 to the volatile memory 171, and execute the program code of the applications. It is noted that although the volatile memory 171 and the non-volatile memory 172 are illustrated as a memory unit, they can be implemented separately as different memory units. In addition, different numbers of volatile memory 171 and/or non-volatile memory 172 can be also implemented in different implementations. The AVM device 160 generates one image (hereinafter also referred to as an AVM image) as shown in FIG. 3 from four images of the photographing regions RA1 to RA4 respectively captured by the image capture devices 110 to 140 and provides the AVM image to a driver through the display device 180 so that the driver may check objects, which are located within a range of 360 degrees with respect to its own driver, through one AVM image. The display device 180 may include either or both of a driving circuit and a display panel and can be disposed internal or external to the AVM device 160. The display device 180 can be, for example, an around-view monitor capable of display the AVM image. The AVM device 160 may further comprise a calibration circuit (not shown) for calibrating parameters of the image capture devices 110 to 140 so as to generate a correct AVM image. To be more specific, the calibration circuit may perform an offline AVM camera geometry calibration for calibrating the extrinsic camera parameters for each of the image capture devices 110 to 140. The AVM system 10 may further comprise an overhead-view (hereinafter referred to as OHV) camera 190 which can be coupled to the AVM device 160 through the interface 150 and disposed at an OHV point above the vehicle to capture an OHV image, as shown in FIG. 2. The OHV image will be described further in the following paragraphs with reference to FIG. 5A. The OHV image is further provided to the AVM device 160 for subsequent image capture device calibration.

Figure 4:
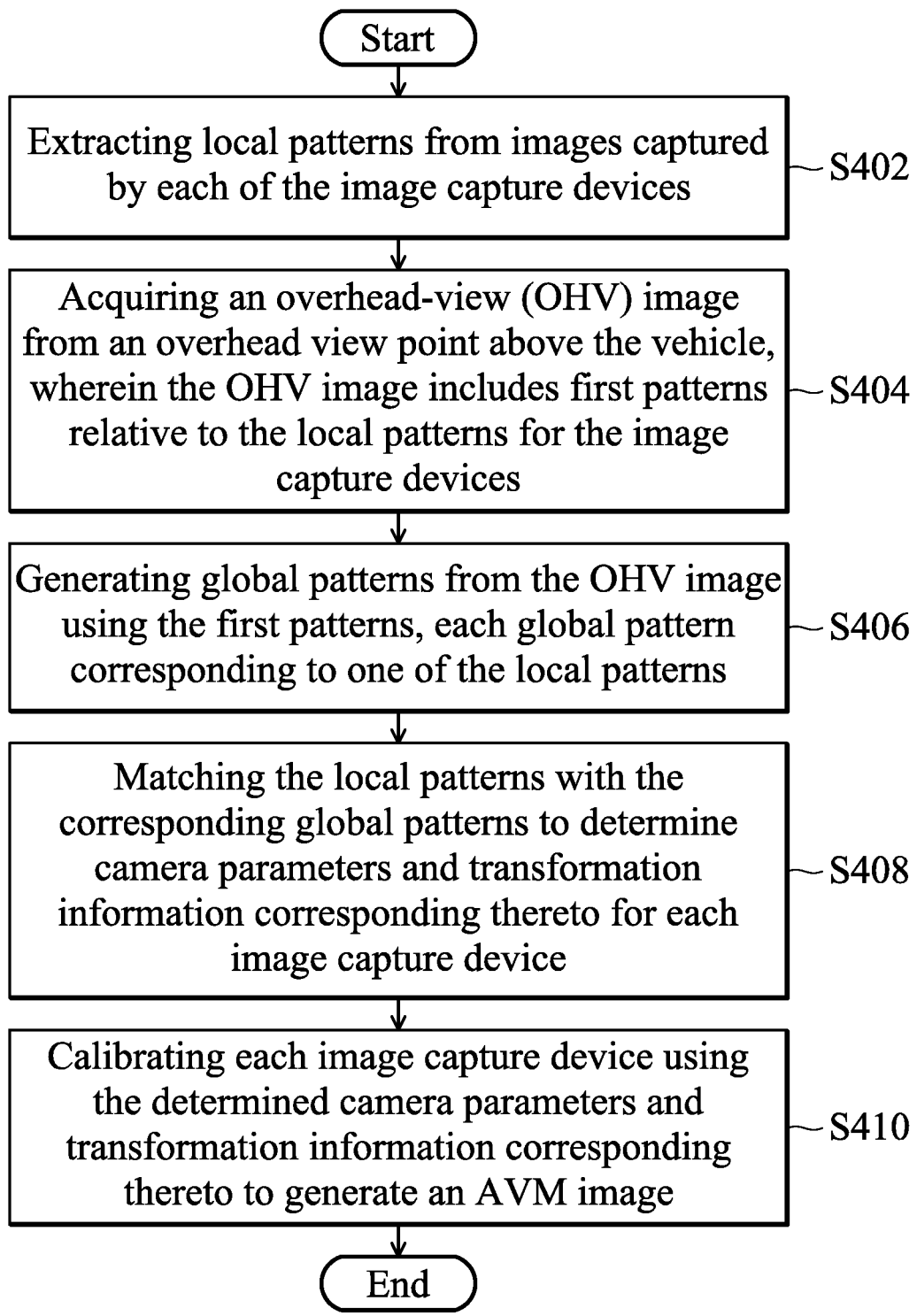
FIG. 4 is a flow chart of a calibration method for calibrating a plurality of image capture devices of the AVM system mounted on a vehicle in one implementation of the disclosure.

FIG. 4 is a flow chart of a calibration method for calibrating a plurality of image capture devices of the AVM system mounted on a vehicle in one implementation of the disclosure. The method may be performed by the AVM system 10 in FIG. 1, for example. The AVM system 10 of FIG. 1 is utilized here for explanation of the flow chart, which however, is not limited to be applied to the AVM system 10 only.

Figure 5A:
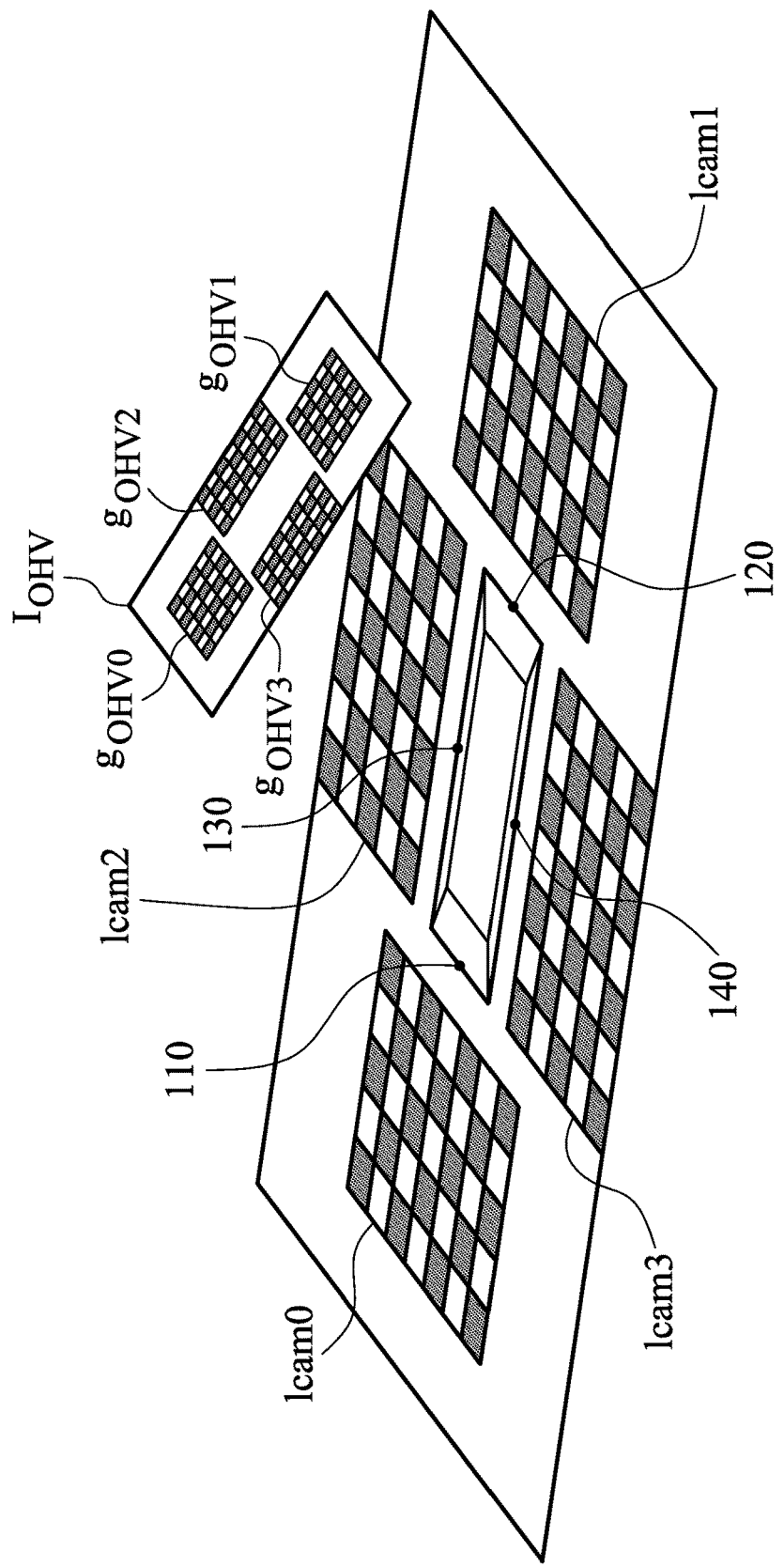
FIG. 5A is a diagram of local patterns and global patterns in accordance with an implementation of the disclosure.

FIG. 5A is a diagram of local patterns and global patterns in accordance with an implementation of the disclosure. Please refer together with FIG. 4 and FIG. 5A.

When the image capture devices 110 to 140 are to be calibrated, in step S402, local patterns are extracted from images captured by each of the image capture devices 110 to 140, wherein each local pattern is respectively disposed at a position within the image capturing range of one of the image capture devices. The step S402 may be performed by the AVM device 160 in FIG. 1, for example. To be more specific, each of the image capture devices 110 to 140 may capture an image including a local pattern to be served as a calibration pattern and thus the AVM device 160 may extract local patterns from captured images. That is, a local pattern could be seen by each image capture device. The local patterns can be presented by 2D point coordinates in the frame of each image capture device. The local pattern can be, for example, a checker board with a predetermined number of grids so that the local pattern may be represented by 2D point coordinates of all the grid points on the checker board. Referring to FIG. 5A, four local patterns lcam0 to lcam3 are illustrated, wherein local pattern lcam0 is disposed at a position within the image capturing range of the image capture device 110, local pattern lcam1 is disposed at a position within the image capturing range of the image capture device 120, local pattern lcam2 is disposed at a position within the image capturing range of the image capture device 130, and local pattern lcam3 is disposed at a position within the image capturing range of the image capture device 140 so that the image capture devices 110 to 140 can capture images including the local patterns lcam0, lcam1, lcam2, and lcam3, respectively, for example.

After extraction of the local patterns, in step S404, an OHV image is acquired from an OHV point above the vehicle (such as the OHV point shown in FIG. 2), wherein the OHV image includes first patterns relative to the local patterns for the image capture devices. The step S404 may be performed by the AVM device 160 in FIG. 1, for example. In this implementation, the OHV image can be captured by the OHV camera 190 at an OHV point above the vehicle. Referring again to FIG. 5A, an OHV image $I_{OHV}$ is captured by the OHV camera 190 at the OHV point and there are 4 first patterns $g_{OHV0}$ to $g_{OHV3}$ in the OHV image $I_{OHV}$, wherein the first pattern $g_{OHV1}$ is relative to the local pattern lcam0, the first pattern $g_{OHV1}$ is relative to the local pattern lcam1, the first pattern $g_{OHV2}$ is relative to the local pattern lcam2, and the first pattern $g_{OHV3}$ is relative to the local pattern lcam3. Particularly, if the first pattern is a checker board with a fixed number of grids, the first pattern could be a 3D point cloud which presents the 3D point positions of grid on the checker board. The first pattern $g_{OHV0}$ is relative to the local pattern lcam0 due to that the points in the first pattern $g_{OHV0}$ should be on the same plane (also referred to as an OHV image plane, which can be defined as a virtual plane parallel to the OHV image), while they might not be parallel to the ground in the three-dimensional (3D) coordinate.

Figure 5B:
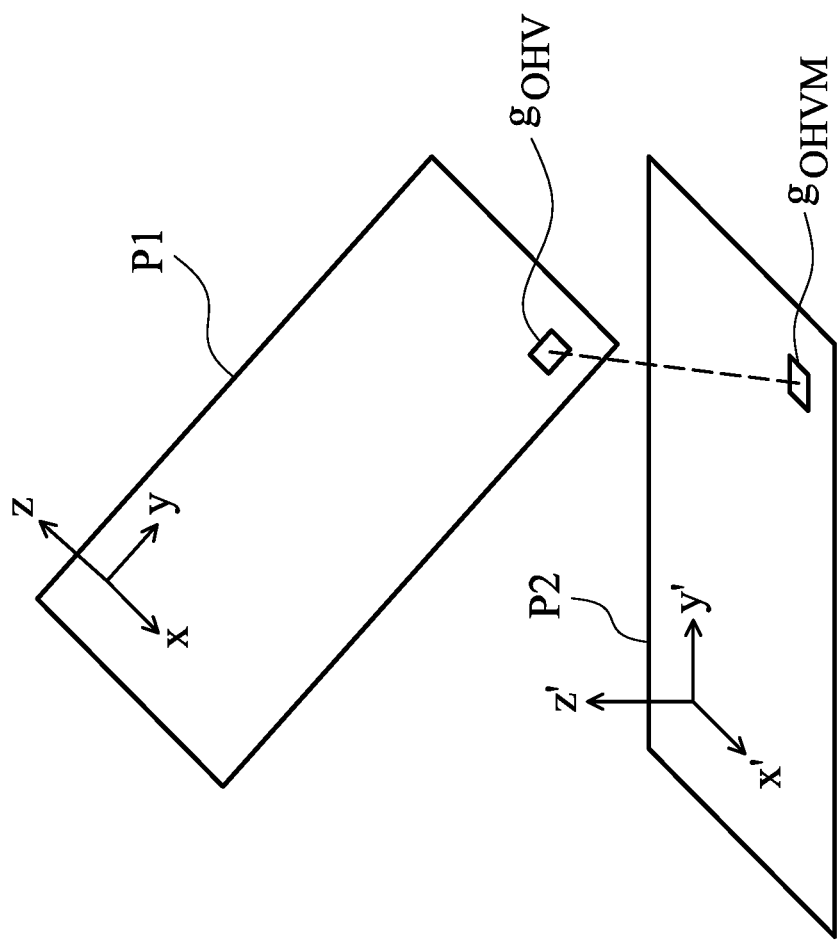
FIG. 5B is a diagram of coordinate conversion in accordance with an implementation of the disclosure.

In step S406, global patterns are then generated from the OHV image using the first patterns, wherein each global pattern corresponds to one of the local patterns. The step S406 may be performed by the AVM device 160 in FIG. 1, for example. In one implementation, the AVM device 160 which generates global patterns from the OHV image using the first patterns may further comprise the following steps: extracting the first patterns from the OHV image; performing coordinate conversion to determine a transformation from a first coordinate relative to the OHV image plane to a second coordinate parallel to ground plane; and applying the determined transformation to the first patterns to generate the global patterns. To be more specific, as aforementioned, the points in the first pattern $g_{OHV}$ should be on the same plane (i.e., the OHV image plane), while they might not be parallel to the ground in the 3D coordinate. Therefore, the AVM device 160 must perform coordinate conversion to determine a transformation from a first coordinate relative to the OHV image plane to a second coordinate parallel to ground plane. Refer together to FIG. 5A and FIG. 5B. FIG. 5B is a diagram of coordinate conversion in accordance with an implementation of the disclosure. As shown in FIG. 5B, the coordinates of each point in the first pattern $g_{OHV}$ will be converted from a first coordinate (x, y, z) relative to the OHV image plane P1 to a second coordinate (x', y', z'=0) parallel to ground plane P2 so as to obtain the global pattern $g_{OHVM}$. In one implementation, the AVM device 160 can perform the coordinate conversion to determine the transformation by using an automatic keystone correction or a homography finding algorithm. The automatic keystone correction can be utilized to correct keystone of an image having a trapezoidal shape to ensure a standard rectangular frame image. The homography finding algorithm can be utilized to find homography between two patterns. To be more specific, transformation information (e.g., a transform matrix $M_{key}$) for the first pattern $g_{OHV}$ to become parallel to the ground could be obtained by using techniques such as automatic keystone correction or homography finding algorithm. Then, a new global pattern $g_{OHVM}$ which is a modified OHV coordinate to let all the 3D grid points be parallel to the ground is obtained by applying the transform matrix $M_{key}$ to the global pattern $g_{OHVM}$.

After the global patterns are generated, in step S408, the local patterns are matched with the corresponding global patterns to determine camera parameters and transformation information corresponding thereto for each image capture device. The step S408 may be performed by the AVM device 160 in FIG. 1, for example. In one implementation, the step of matching the local patterns with the corresponding global patterns to determine the camera parameters and the transformation information corresponding thereto for each image capture device may further comprise the following steps: obtaining a 3D rotation and translation information from the local patterns to the corresponding global patterns; and determining the camera parameters and the transformation information corresponding thereto for each image capture device according to the 3D rotation and translation information. In this step, the AVM device 160 may obtain the 3D rotation and translation information from the local patterns to the corresponding global patterns by using a pose estimation algorithm such as perspective-n-point, but the disclosure is not limited thereto. Such pose estimation algorithm may estimate the pose of a calibrated image capture device given a set of n 3D points in the world and their corresponding 2D projections in the image. The pose estimation algorithm gives 3D rotation and translation transforms from the local patterns lcam to global patterns $g_{OHVM}$.

After the camera parameters and transformation information corresponding thereto for each image capture device are determined, in step S410, each of the image capture devices 110 to 140 is calibrated using the determined camera parameters and transformation information corresponding thereto so as to generate an AVM image. The step S410 may be performed by the AVM device 160 in FIG. 1, for example.

Particularly, in this step, the AVM device 160 may use the 3D rotation and translation information obtained in step S408 to map all the pixels from local camera frame to an overhead view point so as to generate a corrected AVM image output.

Compared to original AVM system that calibrates the image capture devices requiring precisely placing and matching the ground patterns, by the AVM system and associated calibration method of the disclosure, the OHV image-based calibration can easily be performed without placing a great burden on the operator and the processing time in deriving the parameters can be significantly reduced.

According to another implementation of the application, another calibration method for calibrating the image capture devices of the AVM system mounted on a vehicle without providing the OHV image can further be provided. In this implementation, there is no OHV camera 190 for generating the OHV image.

Figure 6:
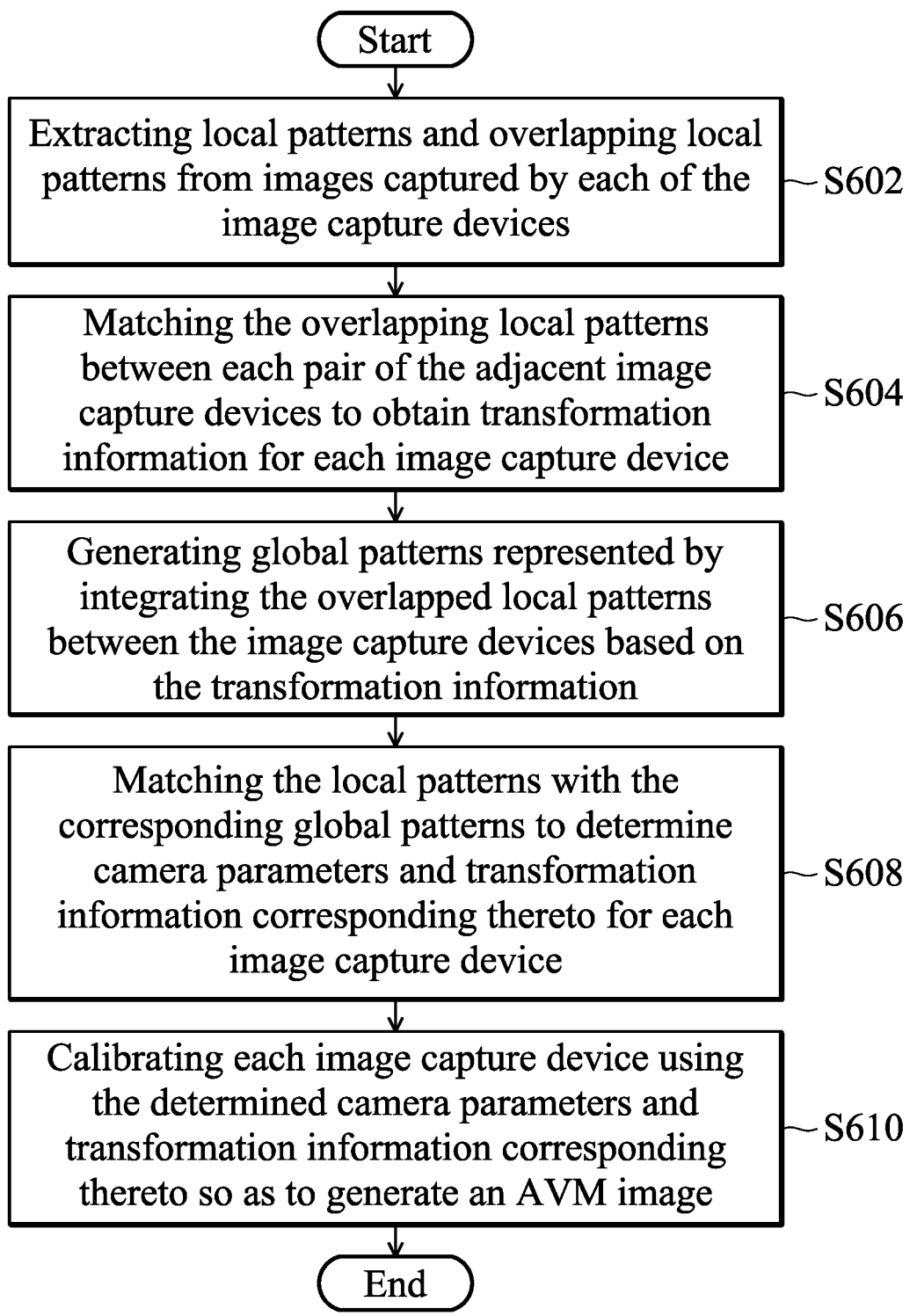
FIG. 6 is a flow chart of a calibration method for calibrating the image capture devices of an AVM system mounted on a vehicle in another implementation of the disclosure.
Figure 7:
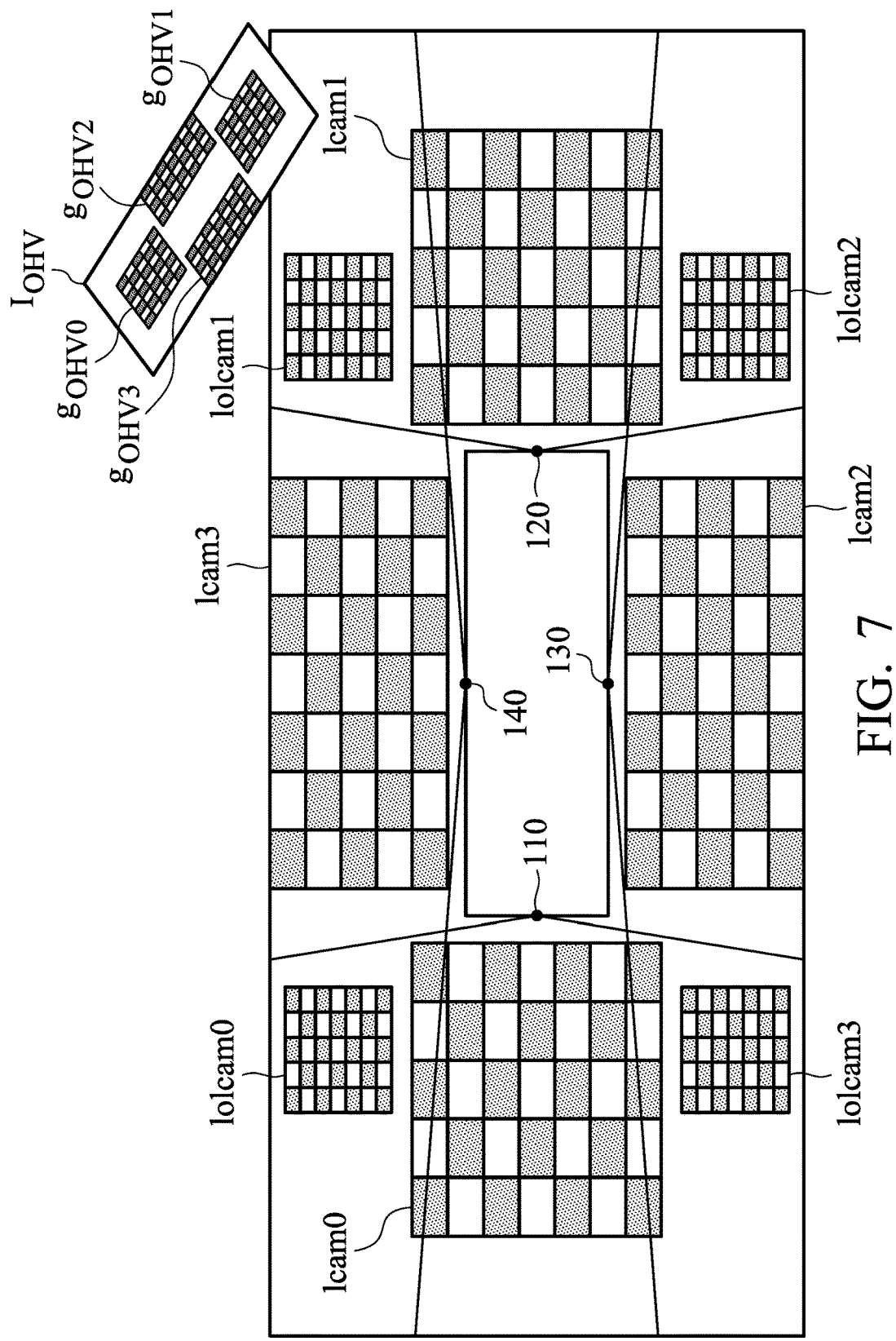
FIG. 7 is a diagram of local patterns, overlapping patterns and global patterns in accordance with an implementation of the disclosure.

FIG. 6 is a flow chart of a calibration method for calibrating the image capture devices of an AVM system mounted on a vehicle in another implementation of the disclosure. The method may be performed by the AVM system 10 in FIG. 1, for example. FIG. 7 is a diagram of local patterns, overlapping patterns and global patterns in accordance with an implementation of the disclosure. Please refer together with FIG. 6 and FIG. 7.

When the image capture devices 110 to 140 are to be calibrated, in step S602, local patterns and overlapping local patterns are extracted from images captured by each of the image capture devices 110 to 140, wherein each local pattern is respectively disposed at a position within the image capturing range of one of the image capture devices and each overlapping local pattern is disposed at an overlapping position at which the image capturing range of each pair of adjacent image capture devices overlap each other. The step S602 may be performed by the AVM device 160 in FIG. 1, for example. To be more specific, each of the image capture devices 110 to 140 may capture an image including a local pattern and an overlapping local pattern to be served as a calibration pattern and thus the AVM device 160 may extract local patterns and overlapping local patterns from captured images. That is, a local pattern could be seen by each image capture device and an overlapping pattern can be seen by each pair of adjacent image capture devices. The local patterns and the overlapping pattern can be presented by 2D point coordinates in the frame of each image capture device. The local pattern can be, for example, checker board with a predetermined number of grids so that the local pattern may be represented by 2D point coordinates of all the grid points on the checker board. Similarly, the overlapping local pattern can be, for example, checker board with a predetermined number of grids so that the overlapping local pattern may be represented by 2D point coordinates of all the grid points on the checker board. In this implementation, the overlapping local patterns could be at oblique front or oblique rear of the vehicle. Referring to FIG. 7, four local patterns lcam0 to lcam3 and four overlapping local patterns lolcam0 to lolcam3 are illustrated. Local pattern lcam0 is disposed at a position within the image capturing range of the image capture device 110, local pattern lcam1 is disposed at a position within the image capturing range of the image capture device 120, local pattern lcam2 is disposed at a position within the image capturing range of the image capture device 130, and local pattern lcam3 is disposed at a position within the image capturing range of the image capture device 140 so that the image capture devices 110 to 140 can capture images including the local patterns lcam0, lcam1, lcam2, and lcam3, respectively. Similarly, overlapping local pattern lolcam0 is disposed at an overlapping position at which the image capturing range of a pair of adjacent image capture devices 110 and 140 overlap each other, overlapping local pattern lolcam1 is disposed at an overlapping position at which the image capturing range of a pair of adjacent image capture devices 140 and 120 overlap each other, overlapping local pattern lolcam2 is disposed at an overlapping position at which the image capturing range of a pair of adjacent image capture devices 120 and 130 overlap each other, and overlapping local pattern lolcam3 is disposed at an overlapping position at which the image capturing range of a pair of adjacent image capture devices 130 and 110 overlap each other. Therefore, each pair of adjacent image capture devices can capture images with a same overlapping local pattern so that the AVM device 160 may extract the overlapping local patterns for each image capture device. For example, the image capture devices 110 and 140 can capture images including the overlapping local pattern lolcam0.

After extraction of the local patterns and the overlapping local patterns, in step S604, the overlapping local patterns between each pair of the adjacent image capture devices are matched to obtain transformation information for each image capture device. The step S604 may be performed by the AVM device 160 in FIG. 1, for example. In this implementation, pose estimation algorithm such as perspective-n-point is utilized to match the overlapping local patterns between each pair of adjacent image capture devices. To be more specific, a transform contains 3D rotation and translation could be obtained between each adjacent image capture devices. In this step, one of the image capture devices can be chosen as a base world coordinate to optimize the transform between adjacent image capture devices. For example, the image capture device 110 can be chosen as a base world coordinate and a first transform matrix Madj1 contains 3D rotation and translation for the image capture device 110 can first be obtained. Then, the first transform matrix Madj1 can be utilized to obtain an optimized second transform matrix Madj2 contains 3D rotation and translation for the image capture device 140. Finally, transform matrices Madj1~4 could be obtained.

Thereafter, in step S606, global patterns represented by integrating the overlapped local patterns between the image capture devices are generated based on the transformation information. The step S606 may be performed by the AVM device 160 in FIG. 1, for example. To be more specific, in this step, the AVM device 160 may transform the overlapping local patterns lolcam0~lolcam3 to be projected to a global coordinate parallel to the OHV image plane by the transform matrices Madj1~4 and integrate the overlapped local patterns between the image capture devices to generate global patterns based on the transformation information, wherein each global pattern corresponds to one of the local patterns. In one implementation, the AVM device 160 generates global patterns represented by integrating the overlapped local patterns between the image capture devices based on the transformation information may further comprise the following steps: performing coordinate conversion to determine a transformation from a first coordinate relative to the OHV image plane to a second coordinate parallel to ground plane; and applying the determined transformation to the overlapped local patterns to generate the global patterns. In one implementation, the AVM device 160 can perform the coordinate conversion to determine the transformation by using an automatic keystone correction or a homography finding algorithm. To be more specific, transformation information (e.g., a transform matrix $M_{key}$) for the first pattern $g_{OHV}$ to become parallel to the ground could be obtained by using techniques such as automatic keystone correction or a homography finding algorithm. Then, a new global pattern $g_{OHVM}$ which is a modified OHV coordinate to let all the 3D grid points be parallel to the ground is obtained by applying the transform matrix $M_{key}$ to the global pattern $g_{OHV}$.

After the global patterns are generated, in step S608, the local patterns are matched with the corresponding global patterns to determine camera parameters and transformation information corresponding thereto for each image capture device. The step S608 may be performed by the AVM device 160 in FIG. 1, for example. In one implementation, the step of matching the local patterns with the corresponding global patterns to determine the camera parameters and the transformation information corresponding thereto for each image capture device may further comprise the following steps: obtaining a 3D rotation and translation information from the local patterns to the corresponding global patterns; and determining the camera parameters and the transformation information corresponding thereto for each image capture device according to the 3D rotation and translation information. In this step, the AVM device 160 may obtain the 3D rotation and translation information from the local patterns to the corresponding global patterns by using a pose estimation algorithm such as perspective-n-point, but the disclosure is not limited thereto. Such pose estimation algorithm may estimate the pose of a calibrated image capture device given a set of n 3D points in the world and their corresponding 2D projections in the image. The pose estimation algorithm gives 3D rotation and translation transforms from the local patterns lcam to global patterns $g_{OHVM}$.

After the camera parameters and transformation information corresponding thereto for each image capture device are determined, in step S610, each of the image capture devices 110 to 140 is calibrated using the determined camera parameters and transformation information corresponding thereto so as to generate an AVM image. The step S410 may be performed by the AVM device 160 in FIG. 1, for example. Particularly, in this step, the AVM device 160 may use the 3D rotation and translation information obtained in step S408 to map all the pixels from local camera frame to an overhead view point so as to generate a corrected AVM image output. More details about each step can be referred to implementations in connection to FIGS. 1, 4, 5A and 5B, but not limited thereto. Moreover, the steps can be performed in different sequences and/or can be combined or separated in different implementations.

In some implementations, applications for the AVM system combined with a number of detections can be provided. For example, in one implementation, an application of passenger protection can be provided. In this implementation, the AVM device can perform a passenger detection to detect whether there is any vehicle or pedestrian appearing in the AVM image and perform a door-opening detection to detect whether the door is being opened, and when the AVM device detects vehicle or pedestrians while the passenger tries to open the door, the AVM device can alert the passenger by predefined alert operations or signals such as alerting sounds or automatically keeping the door locked so as to avoid the passenger from opening the door and hitting the outside object. In one implementation, a sensor could be equipped on the handle of the door to detect if the passenger intends to open the door. In another implementation, the AVM device may further provide an alert signal generator to generate predefined alert signal which may include lights and sounds to hint the passenger to avoid the passenger from opening the door and hitting the outside object (e.g., vehicle (such as motorcycle or bicycle) or pedestrian).

In view of the above implementations, an AVM system with a plurality of image capture devices and an associated calibration method for calibrating the image capture devices are provided. An OHV image or overlapping patterns can be utilized to perform an offline AVM camera geometry calibration for calibrating the extrinsic camera parameters for each of the image capture devices instead of matching accurate ground patterns, thus substantially enhancing the efficiency of AVM installation without long time consuming and redundant procedure. Moreover, the AVM system can be combined with detections to provide more functionality, thereby providing the driver a better visual assistance and judgment to protect the vehicle from any undesired damage or collision and providing a better passenger protection.

The implementations described herein may be implemented in, for example, a method or process, an apparatus, or a combination of hardware and software. Even if only discussed in the context of a single form of implementation (for example, discussed only as a method), the implementation of features discussed may also be implemented in other forms. For example, implementation can be accomplished via a hardware apparatus or a hardware and software apparatus. An apparatus may be implemented in, for example, appropriate hardware, software, and firmware. The methods may be implemented in an apparatus such as, for example, a processor, which refers to any processing device, including, for example, a computer, a microprocessor, an integrated circuit, or a programmable logic device.

While the disclosure has been described by way of example and in terms of the preferred embodiments, it is to be understood that the disclosure is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A calibration method for calibrating a plurality of image capture devices of an around view monitoring (AVM) system mounted on a vehicle, the calibration method comprising:

extracting local patterns and overlapping local patterns from images captured by each of the image capture devices, wherein each local pattern is respectively disposed at a position within the image capturing range of one of the image capture devices and each overlapping local pattern is disposed at an overlapping position at which the image capturing range of each pair of adjacent image capture devices overlap each other;

matching the overlapping local patterns between each pair of the adjacent image capture devices to obtain transformation information for each image capture device;

generating global patterns represented by integrating the overlapped local patterns between the image capture devices based on the transformation information;

matching the local patterns with the corresponding global patterns to determine camera parameters and transformation information corresponding thereto for each image capture device; and calibrating each image capture device using the determined camera parameters and transformation information corresponding thereto so as to generate a AVM image.

2. The calibration method as claimed in claim 1, further comprising:
matching the overlapping local patterns between each pair of the adjacent image capture devices to obtain the transformation information for each image capture device by using a pose estimation algorithm.

3. The calibration method as claimed in claim 1, wherein the step of matching the local patterns with the corresponding global patterns to determine the camera parameters and the transformation information corresponding thereto for each image capture device further comprises:
obtaining a three-dimensional (3D) rotation and translation information from the local patterns to the corresponding global patterns; and
determining the camera parameters and the transformation information corresponding thereto for each image capture device according to the 3D rotation and translation information.

4. The calibration method as claimed in claim 3, further comprising:
obtaining the 3D rotation and translation information from the local patterns to the corresponding global patterns by using a pose estimation algorithm.

5. The calibration method as claimed in claim 1, further comprising:
Performing an object detection and a door-opening detection;
Detecting a vehicle or pedestrians while an door opening operation is detected; and
generating alert signal or automatically keeping the door being locked to prevent the door from being opened.

6. An around view monitoring (AVM) system for a vehicle, comprising:
a plurality of image capture devices mounted on the vehicle, configured to capture images with local patterns, wherein each local pattern is respectively disposed at a position within the image capturing range of one of the image capture devices;
an AVM device coupled to the image capture devices, configured to extracting local patterns from images captured by each of the image capture devices, acquiring an overhead-view (OHV) image from an overhead view point above the vehicle, wherein the OHV image includes first patterns relative to the local patterns for the image capture devices, generating global patterns from the OHV image using the first patterns, each global pattern corresponding to one of the local patterns, matching the local patterns with the corresponding global patterns to determine camera parameters and transformation information corresponding thereto for each image capture device, and calibrating each image capture device using the determined camera parameters and transformation information corresponding thereto so as to generate a AVM image; and
a display device coupled to the AVM device, configured to display the AVM image.

7. The AVM system as claimed in claim 6, wherein the AVM device further extracts the first patterns from the OHV image, performs coordinate conversion to determine a transformation from a first coordinate relative to the OHV image plane to a second coordinate parallel to ground plane, and applies the determined transformation to the first patterns to generate the global patterns.

8. The AVM system as claimed in claim 7, wherein the AVM device further performs the coordinate conversion to determine the transformation by using an automatic keystone correction or a homography finding algorithm.

9. The AVM system as claimed in claim 6, wherein the AVM device further matches the local patterns with the corresponding global patterns to determine the camera parameters and the transformation information corresponding thereto for each image capture device by obtaining a three-dimensional (3D) rotation and translation information from the local patterns to the corresponding global patterns, and determining the camera parameters and the transformation information corresponding thereto for each image capture device according to the 3D rotation and translation information.

10. The AVM system as claimed in claim 9, wherein the AVM device further obtains the 3D rotation and translation information from the local patterns to the corresponding global patterns by using a pose estimation algorithm.

11. The AVM system as claimed in claim 6, wherein the AVM device further performs object detection and a door-opening detection, detects a vehicle or pedestrians while an door opening operation is detected, and generates alert signal or automatically keeping the door being locked to prevent the door from being opened.

* * * * *